United States Patent
Jiang et al.

(10) Patent No.: US 10,177,447 B2
(45) Date of Patent: Jan. 8, 2019

(54) RADIO FREQUENCY TRANSPARENT PATTERNS FOR CONDUCTIVE COATING

(71) Applicant: Apple Inc., Cupertino, CA (US)

(72) Inventors: Yi Jiang, Cupertino, CA (US);
Jiangfeng Wu, San Jose, CA (US);
Siwen Yong, San Francisco, CA (US);
Lijun Zhang, San Jose, CA (US);
Mattia Pascolini, San Francisco, CA (US); Martin Melcher, Mountain View, CA (US); James Wilson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/710,474

(22) Filed: Sep. 20, 2017

(65) Prior Publication Data

US 2018/0090825 A1   Mar. 29, 2018

Related U.S. Application Data

(60) Provisional application No. 62/399,134, filed on Sep. 23, 2016.

(51) Int. Cl.
| | |
|---|---|
| *H01Q 1/38* | (2006.01) |
| *H01Q 1/24* | (2006.01) |
| *H01Q 1/42* | (2006.01) |
| *H01Q 15/00* | (2006.01) |
| *H01Q 21/00* | (2006.01) |
| *H04B 1/3827* | (2015.01) |
| *H04M 1/02* | (2006.01) |
| *C03C 17/06* | (2006.01) |

(Continued)

(52) U.S. Cl.
CPC .......... *H01Q 1/245* (2013.01); *C03C 17/06* (2013.01); *G06F 1/181* (2013.01); *H01Q 1/42* (2013.01); *H01Q 15/0013* (2013.01); *H01Q 21/0006* (2013.01); *H04B 1/3833* (2013.01); *H04M 1/0283* (2013.01); *H04M 1/72* (2013.01); *C03C 2217/25* (2013.01); *C03C 2218/33* (2013.01)

(58) Field of Classification Search
CPC ................................ H01Q 1/42; H01Q 1/245
See application file for complete search history.

(56) References Cited

U.S. PATENT DOCUMENTS

| | | | | |
|---|---|---|---|---|
| 5,420,475 A | * | 5/1995 | Nakamura | H01J 29/86 313/474 |
| 7,456,793 B2 | * | 11/2008 | Napoles | H01Q 1/243 343/700 MS |
| 2014/0361945 A1 | * | 12/2014 | Misra | H01Q 1/42 343/789 |

FOREIGN PATENT DOCUMENTS

| | | |
|---|---|---|
| EP | 2424034 A1 | 2/2012 |
| WO | 2007/001683 A1 | 1/2007 |
| WO | 2014/197328 A1 | 12/2014 |

OTHER PUBLICATIONS

International Search Report and Written Opinion for PCT Application No. PCT/US2017/052743 dated Dec. 11, 2017; 11 pgs.

* cited by examiner

*Primary Examiner* — Tuan H Nguyen
(74) *Attorney, Agent, or Firm* — Fletcher Yoder PC

(57) ABSTRACT

Methods and devices useful in radio frequency (RF) signal transmission are provided. By way of example, a wireless electronic device may include a transceiver, and an enclosure in which the transceiver is disposed. The enclosure may include an RF transparent layer and an RF opaque coating disposed on the RF transparent layer, where the RF opaque (Continued)

coating includes a pattern formed therein to enable RF signals to pass therethrough.

23 Claims, 14 Drawing Sheets

(51) Int. Cl.
    *G06F 1/18*         (2006.01)
    *H04M 1/72*       (2006.01)

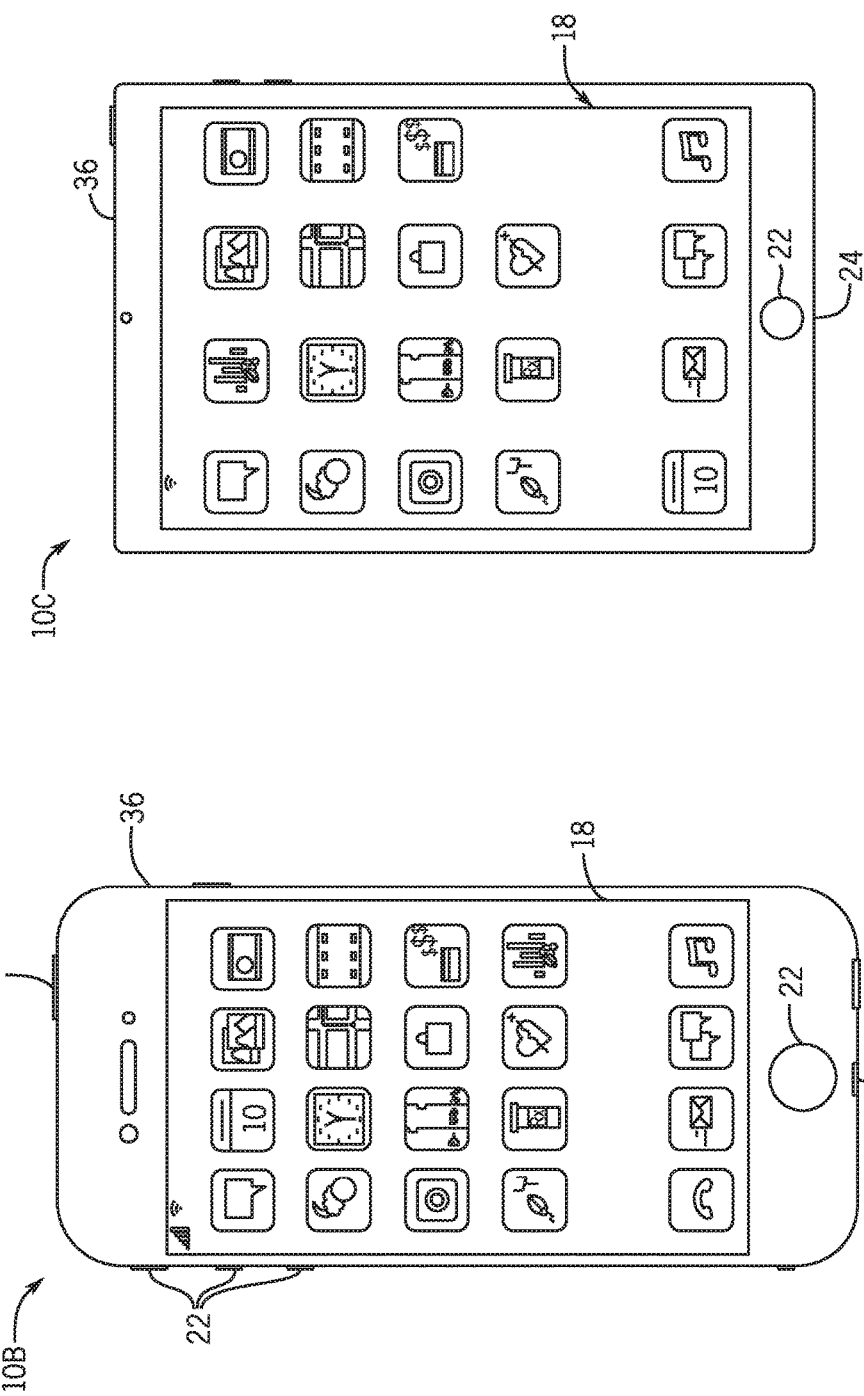

PATCH SIZE "a" (mm)

| ETCHING AREA RATIO | b = 0.01mm | | | b = 0.05mm | | |
|---|---|---|---|---|---|---|
| | SQUARE | TRI. | HEX. | SQUARE | TRI. | HEX. |
| 0.01 | 1.98 | 3.44 | 1.15 | 9.92 | 17.19 | 5.73 |
| 0.02 | 0.98 | 1.71 | 0.57 | 4.92 | 8.53 | 2.84 |
| 0.05 | 0.38 | 0.67 | 0.22 | 1.92 | 3.33 | 1.11 |
| 0.1 | 0.18 | 0.32 | 0.11 | 0.92 | 1.60 | 0.53 |
| 0.2 | 0.08 | 0.15 | 0.05 | 0.42 | 0.73 | 0.24 |

US 10,177,447 B2

RADIO FREQUENCY TRANSPARENT PATTERNS FOR CONDUCTIVE COATING

CROSS REFERENCE TO RELATED APPLICATIONS

This application is a Non-Provisional Application claiming priority to U.S. Provisional Patent Application No. 62/399,134, entitled "RADIO FREQUENCY TRANSPARENT PATTERNS FOR CONDUCTIVE COATING," filed Sep. 23, 2016, which is herein incorporated in its entirety for all purposes.

BACKGROUND

The present disclosure relates generally to coatings of cellular and wireless devices, and more particularly, to metal coatings having radio frequency transparent features.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transmitters and receivers, or when coupled together as part of a single unit, transceivers, are commonly included in various electronic devices, and particularly, portable electronic devices such as, for example, phones (e.g., mobile and cellular phones, cordless phones, personal assistance devices), computers (e.g., laptops, tablet computers), internet connectivity routers (e.g., Wi-Fi routers or modems), radios, televisions, or any of various other stationary or handheld devices. Certain types of transceivers, known as wireless transceivers, may be used to generate and receive wireless signals to be transmitted and/or received by way of an antenna coupled to the transceiver. Specifically, the wireless transceiver is generally used to wirelessly communicate data over a network channel or other medium (e.g., air) to and from one or more external wireless devices.

Transceivers such as those described above may be disposed within (e.g., internal to) a wireless device. Unfortunately, other components or features of the wireless device may interfere with signals communicated to and from the transceiver. As such, it may be useful to provide more advanced and improved devices to support signal transmission to and from the transceiver.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various embodiments of the present disclosure may be useful in enabling radio frequency (RF) signal transmission through, for example, an RF opaque coating of a wireless device. By way of example, a wireless electronic device may include a transceiver, and an enclosure in which the transceiver is disposed. The enclosure may include an RF transparent layer and an RF opaque coating disposed on the RF transparent layer, where the RF opaque coating includes a pattern formed therein to enable RF signals to pass therethrough.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a hand-held device representing another embodiment of the electronic device of FIG. 1;

FIG. 4 is a front view of another hand-held device representing another embodiment of the electronic device of FIG. 1;

DETAILED DESCRIPTION

Figure 1:
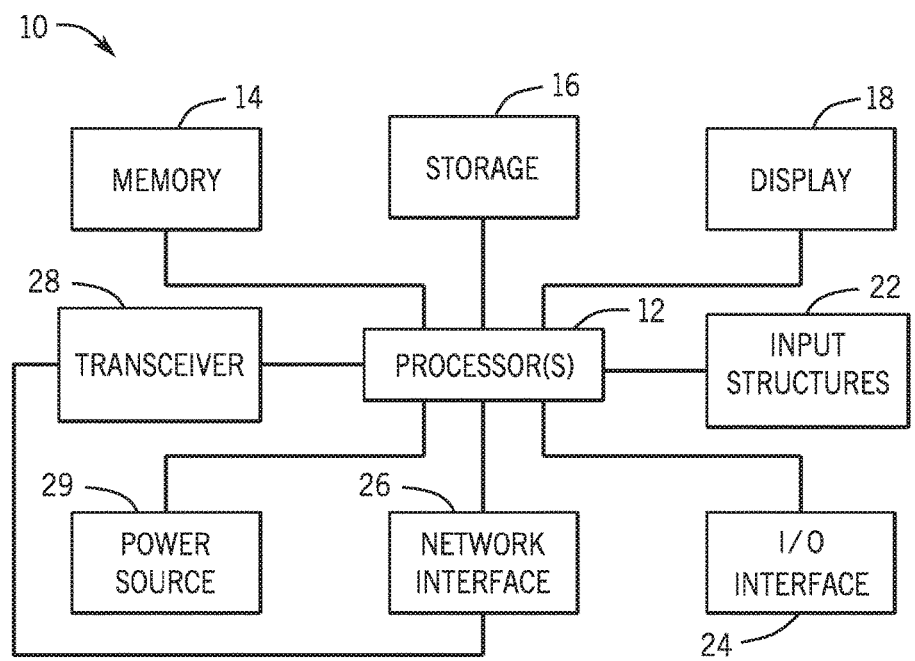
FIG. 1 is a schematic block diagram of an electronic device including an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure generally relate to a layered structure of, for example, a housing of an electronic device. The electronic device may include an RF transparent layer (e.g., dielectric layer such as a glass layer or plastic layer) of the housing, and a RF opaque layer or coating (e.g., conductive coating, metal coating) disposed on a surface of the RF transparent layer. The layered structure (e.g., of the housing) may enable desirable aesthetic features of the electronic device. It should be noted that the following discussion, for clarity, may refer to an electronic device having a glass layer and a metal coating disposed on the glass layer. However, it should be appreciated that the disclosed concepts can be implemented in comparable scenarios involving any RF transparent layer (e.g., any dielectric layer such as a glass layer or plastic layer) having an RF opaque layer or coating (e.g., conductive coating, metal coating) disposed thereon. Further, it should be appreciated that the disclosed concepts can be implemented on other devices and structures through which RF signal transmission is desired, such as buildings, motor vehicles, cycles, vessels and the like.

In certain areas or regions of the metal coating, a portion of the glass layer may be exposed through the metal coating of the layered structure. For example, material from the metal coating may be removed (e.g., etched, stripped, or otherwise removed) to form gaps along the metal coating, where the gaps may form a pattern. Additionally or alternatively, the metal material may be coated onto the glass layer to include the gaps forming the pattern. While the material of the metal coating may block or degrade transmission of an RF signal, the gaps forming the pattern along the metal coating may be transparent to the RF signal. Further, the gaps and/or the pattern along the metal coating may be indiscernible to the human eye. Accordingly, the gaps in the metal coating may enable the RF signal to pass therethrough (e.g., to an RF transceiver), without degrading the aesthetic features enabled by the layered structure. These and other features will be described in detail below with reference to the figures.

With the foregoing in mind, a general description of suitable electronic devices that may employ an electronic display will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, network interfaces 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
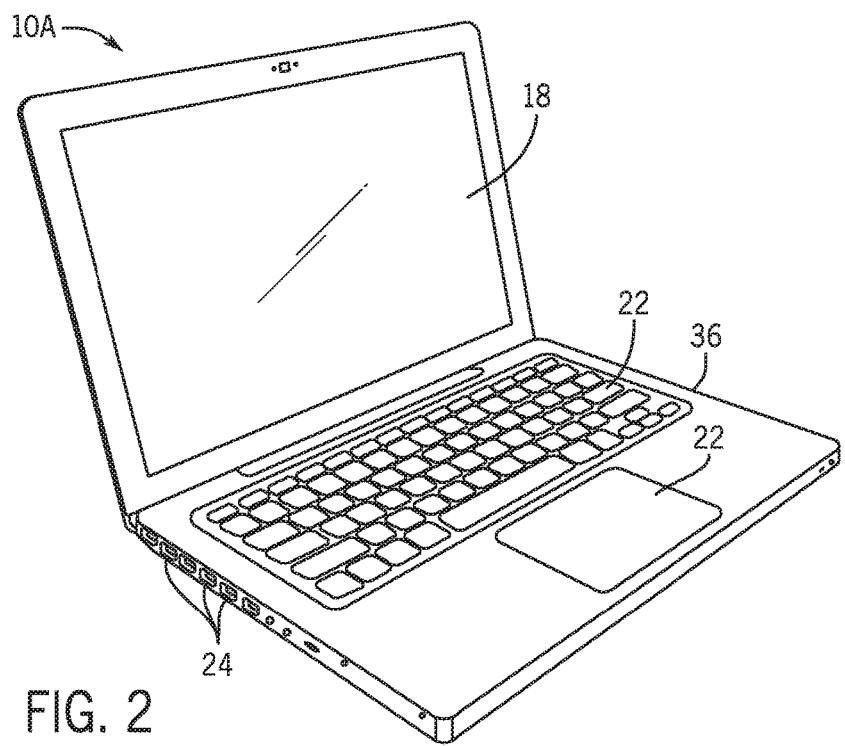
FIG. 2 is a perspective view of a notebook computer representing an embodiment of the electronic device of FIG. 1.
Figure 5:
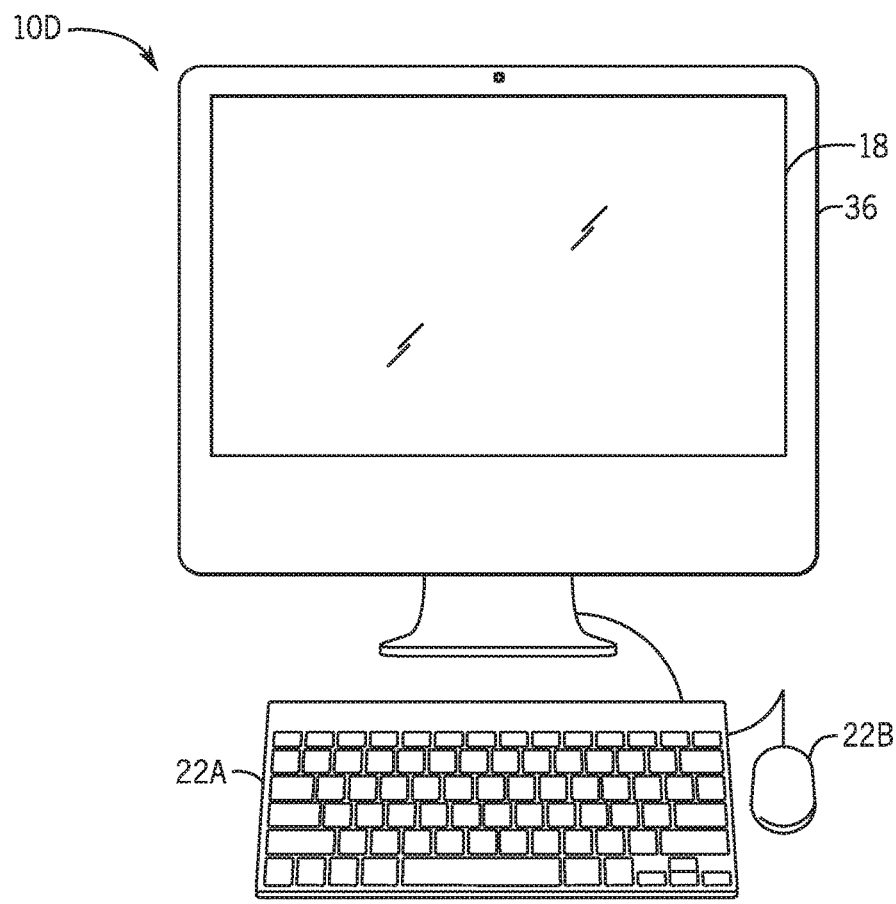
FIG. 5 is a front view of a desktop computer representing another embodiment of the electronic device of FIG. 1.
Figure 6:
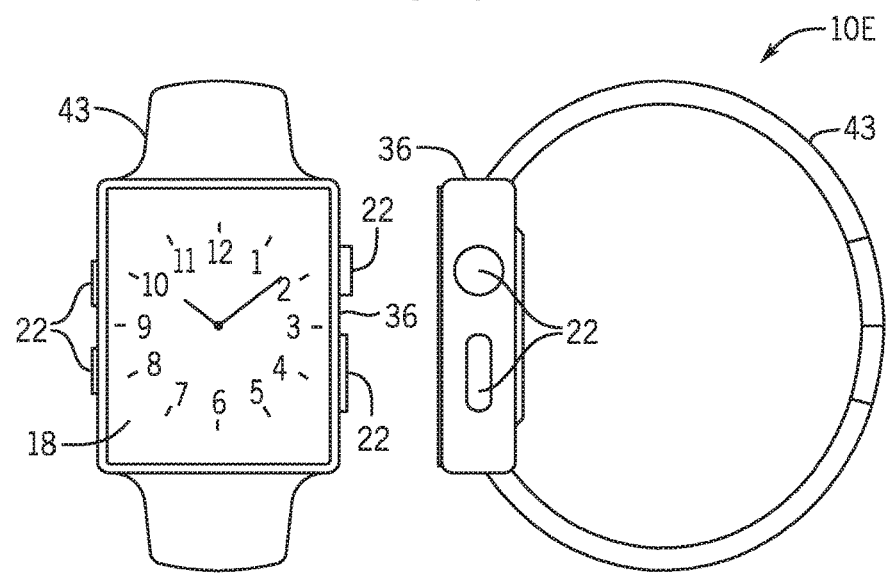
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be an active-matrix organic light emitting diode (AMOLED) display, which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, or long term evolution license assisted access (LTE-LAA) cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, LTE, and so forth), the electronic device 10 may include a transceiver 28. The transceiver 28 may include any circuitry that may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, the transceiver 28 may transmit and receive OFDM signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, and LTE and LTE-LAA cellular networks), WiMAX networks, mobile WiMAX networks, ADSL and VDSL networks, DVB-T and DVB-H networks, UWB networks, and so forth. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol. As mentioned above, all or part of the enclosure 36 may be made of glass and all or a part of the glass may be coated with a patterned metal as described herein.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
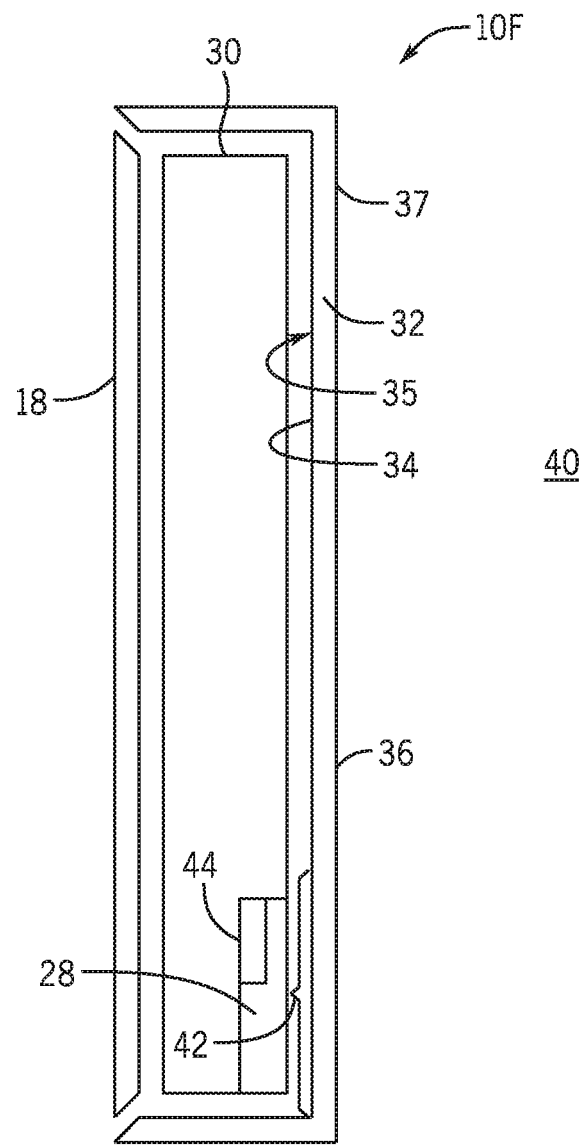
FIG. 7 is a cross-sectional, partially exploded side view of another embodiment of the electronic device of FIG. 1.

Turning to FIG. 7, a cross-sectional, partially exploded side view of an electronic device 10F, representing another embodiment of the electronic device 10 of FIG. 1, is shown. The illustrated electronic device 10F may be any one of the notebook computer 10A of FIG. 2, the handheld device 10B of FIG. 3, the handheld device 10C of FIG. 4, the computer 10D of FIG. 5, the wearable device 10E of FIG. 6, or any other suitable electronic device. As shown, the electronic device 10F may include internal componentry 30 having one or more components of the electronic device 10F. For example, the internal componentry 30 may include the transceiver 28, an antenna 44, and other circuitry or components of the electronic device 10F. The electronic device 10F may also include the enclosure 36 (e.g., a three-sided enclosure) at least partially surrounding the internal componentry 30, where the enclosure 36 includes, for example, a glass layer 32. It should be noted that, in some embodiments, the glass layer 32 may be separate from the enclosure 36. For example, the glass layer 32 may be a case disposed around the enclosure 36. Further, it should be noted that, as shown, the enclosure 36 may include, or be coupled to, the display 18 of the electronic device 10F.

In accordance with the present disclosure, the glass layer 32 may include an inner surface 34 having a coating 35 disposed (e.g., coated) thereon, where the coating 35 may be considered a part of the enclosure 36 of the electronic device 10F. In some embodiments, the coating 35 may additionally or alternatively be disposed on an outer surface 37 of the glass layer 32 opposite to the inner surface 34 of the glass layer or laminated between multiple layers of glass. Further, in some embodiments, the inner surface 34 may include one or more coatings of one or more different materials. For example, the illustrated coating 35 may be, or include, a metal. The combination of the glass layer 32 and the metal coating 35 may enable desirable aesthetic features of the electronic device 10F. Further, the metal coating 35 may act as a heat resistant layer between an internal area 38 (e.g., inside) of the electronic device 10F and the glass layer 32 of the electronic device 10F or an environment 40 external to the electronic device 10F. Heat resistant performance of the metal coating 35 may depend at least in part on a thickness of the metal coating 35.

As previously described, the electronic device 10F may include the transceiver 28 configured to send and/or receive communications via a radio frequency ("RF") signal. In some embodiments, depending on several factors including the type of material used for the coating 35 (e.g., metal), the thickness of the coating 35, and the angle of incidence of the RF signal, the metal coating 35 may cause total reflection (e.g., total internal reflection) of the RF signal. In other words, the metal material of the metal coating 35 may block the RF signal from reaching the transceiver 28 (or from being transmitted by the transceiver 28 beyond the metal coating 35). However, in accordance with present embodiments, the metal coating 35 may include gaps in the material of the metal coating 35, such that the glass layer 32 is exposed through the gaps. In some embodiments, the gaps may form a pattern. For example, the gaps may be etched into the metal coating 35 to remove portions of the material (e.g., metal) that cause reflection of (e.g., blocking of) the RF signal being sent to or from the transceiver 28, and the gaps may form a hexagonal pattern. Alternatively, the metal coating 35 may be initially disposed on the glass layer 32 with the gaps in the metal coating 35 forming the pattern. The gaps in the metal coating 35, which form the pattern as described above, can be selected in size and shape to allow RF signals to be transmitted into and out of the device 10F. In accordance with the description below with reference to later figures, the patterns formed in the coating 35 may be limited to a particular region 42 or area of the coating 35, and the region 42 may be selected based on its proximity to a position of the transceiver 28 and/or the antenna 44 thereof within the electronic device 10F.

Figure 10:
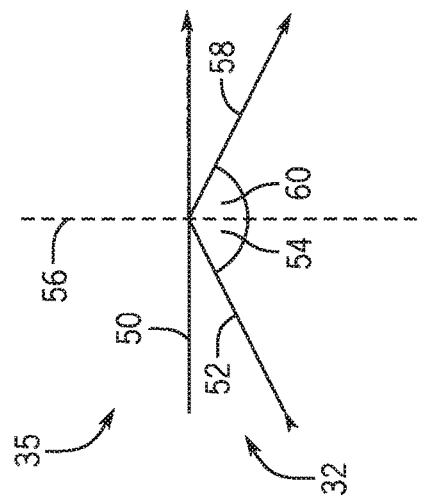
FIG. 10 is a schematic diagram of total internal reflection of an RF signal at an interface between a glass layer and a metal coating of the electronic device of FIG. 1.
Figure 9:
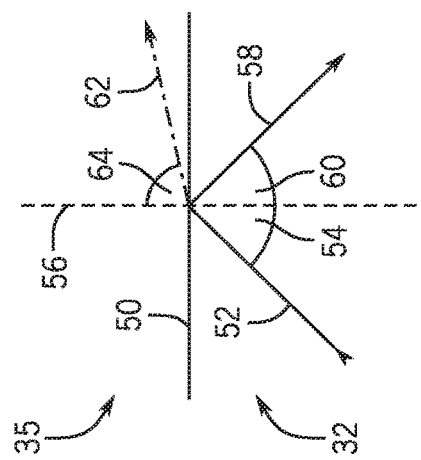
FIG. 9 is a schematic diagram of an RF signal refracting through, and reflecting across, an interface between a glass layer and a metal coating of the electronic device of FIG. 1.
Figure 8:
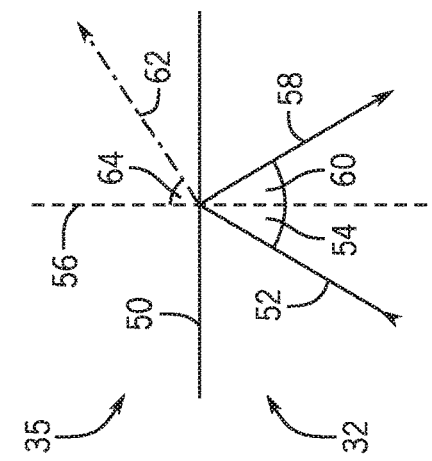
FIG. 8 is a schematic diagram of a radio frequency (RF) signal refracting through, and reflecting across, an interface between a glass layer and a metal coating of the electronic device of FIG. 1.

For clarity, FIGS. 8-10 illustrate an RF signal meeting an interface 50 between two materials. The following discussion with respect to FIGS. 8-10 relates to an angle of incidence of the RF signal, and how the angle of incidence impacts RF signal transmission. However, as will be appreciated below with reference to later figures, other factors may also impact RF signal transmission, including but not limited to the characteristics of the pattern along the metal coating 35, the thickness of the metal coating 35 and/or glass layer 32, the type of metal used for the metal coating 35, and the type of glass used for the glass layer 32.

In the illustrated embodiment, the interface 50 may be between the glass layer 32 and the metal coating 35 of the electronic device 10F of FIG. 7. However, the interface 50 in accordance with the present disclosure may be between the glass layer 32 and air (e.g., of the environment illustrated in FIG. 7), or between the metal coating 35 and the air (e.g., in embodiments having the metal coating 35 disposed on the outer surface 37 of the device 10F in FIG. 7). As shown in each of FIGS. 8-10, the RF signal includes an incident ray 52 traveling through the glass layer 32 at an incidence angle 54 with respect to a normal 56 of the interface 50. Further, in each of FIGS. 8-10, at least a portion of the RF signal, referred to as a reflected ray 58, reflects from the interface 50 at a reflection angle 60 with respect to the normal 56 of the interface 50. In some embodiments (e.g., depending on the type and/or frequency of the RF signal), the incidence angle 54 may be equal or close to equal to the reflection angle 60. Further still, in FIGS. 8 and 9, at least a portion of the RF signal, referred to as a refracted ray 62, refracts across the interface 50 at a refraction angle 64 with respect to the normal 56 of the interface 50. In the illustrated embodiments, as the angle of incidence 54 increases, so too does the angle of refraction 64. In FIG. 10, the angle of incidence 54 is such that no portion of the RF signal refracts through the interface 50, which may be referred to as total internal reflection. The smallest incidence angle 54 at which no portion of the RF signal refracts through the interface may be referred to as the critical angle. As previously described, other factors such as a thickness of the metal coating 35 and/or glass layer 32 may determine whether the RF signal transmits through the metal coating 35.

In general, several factors may determine the critical angle. For example, factors that may determine the critical angle may include the type of materials forming the interface 50, the thickness of the glass layer 32 and the metal coating 35, the frequency of the RF signal, the strength of the RF signal, and other factors. With respect to the electronic device 10F illustrated in FIG. 7, the combination of factors described above may be such that no or very little RF signal passes through the metal coating 35. Accordingly, as described above with respect to FIG. 7 and in detail below with reference to later figures, one or more portions 42 of the metal coating 35 may include patterns formed into the metal coating 35 (e.g., to remove the metal material from the metal coating 35). In this way, the RF signal may more readily pass through the interface between the glass layer 32 and the metal coating 35, and through the metal coating 35 in general, to reach the transceiver 28 and/or the antenna 44 thereof (or to be sent from the transceiver 28 beyond the metal coating 35 and the glass layer 32).

Figure 11:
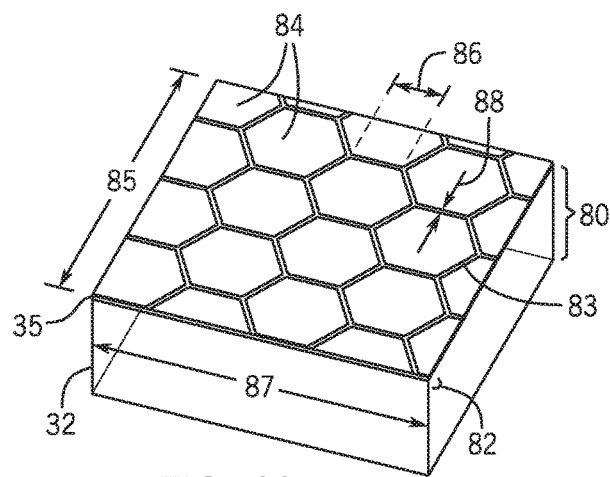
FIG. 11 is a schematic illustration of a perspective view of a glass layer and metal coating the electronic device of FIG. 1, where the metal coating includes a hexagonal pattern formed into the metal coating.

Turning to FIG. 11, a schematic illustration of a perspective view of the glass layer 32 and the metal coating 35 of the electronic device 10 of FIG. 1 is shown, where the metal coating 35 includes a hexagonal pattern formed into the metal coating 35. In the illustrated embodiment, the glass layer 32 includes a thickness 80 (e.g., height), and the metal coating 35 includes a thickness 82 (e.g., height). The thickness 80 of the glass layer 32 may be, for example, between 6 millimeters and 1 millimeter, between 5.5 millimeters and 2 millimeters, between 5 millimeters and 3 millimeters, or approximate 4.8 millimeters. The thickness 82 of the metal coating 35 may be, for example, between 100 nanometers and 10 nanometers, between 75 nanometers and 25 nanometers, or approximate 50 nanometers. As previously described, the thicknesses 80, 82 of the glass layer 32 and the metal coating 35 may play a role in the amount of RF signal that is able to pass therethrough. However, in general, the metal coating 35 may block the RF signal more substantially than the glass layer 32, and in some embodiments, the metal coating 35, absent patterns formed therein by the gaps in the metal coating 35, may block the RF signal entirely. Limiting the thickness 82 of the metal coating 35 may enable the formation (e.g., etching) of the patterns thereon, which may not otherwise be possible and/or as effective if the metal coating 35 is too thick.

In the illustrated embodiment, the pattern is a hexagonal pattern including several hexagons 84 formed into the metal coating 35. The hexagons 84 are separated by gaps 83, where the gaps 83 show the exposed portions of the glass layer 32. In other words, the illustrated hexagons 84 include the metal material of the metal coating 35, and the illustrated gaps 83 between the hexagons 84 show the exposed glass material of the glass layer 32 beneath the metal coating 35. The pattern may be defined at least in part by two characteristics: a gap length 86 of each segment of the gaps 83, and a width 88 of each segment of the gaps 83. It should be noted that sizes of the hexagons 84 may be dependent on the gap length 86 and/or width 88 of each segment of the gaps 83.

A "gap ratio" of the surface area of the gaps 83 with respect to a surface area of the patterned portion of the metal coating 35 may be calculated, in the illustrated embodiment, by dividing a surface area of the gaps 83 by a combined surface area of the gaps 83 and the metal material of the metal coating 35 (e.g., the hexagons 84). Put differently, a gap ratio of 0.0 (i.e., 0%) corresponds with an area of the metal coating 35 in which none of the glass layer 32 is exposed, while a gap ratio of 1.0 (i.e., 100%) corresponds with an area along the metal coating 35 having only exposed glass. In certain embodiments, the gap ratio may be between 0.1 and 10 percent, between 0.5 and 5 percent, or between 1 and 3 percent. In the illustrated embodiment, the total area (e.g., of the combination of the gaps 83 and the metal material forming the hexagons 84) is equal to a length 85 of the total area multiplied by a width 87 of the total area. The surface area of the gaps 83 is equal to the gap length 86 of each of the gaps 83, multiplied by the gap width 88 of each of the gaps 83, multiplied by the total number of segments of the gaps 83 (adjusting for overlap of the gaps 83). As previously described, the gap ratio set forth above may generally be a factor of the amount of RF signal that passes through the metal coating 35.

Figure 12:
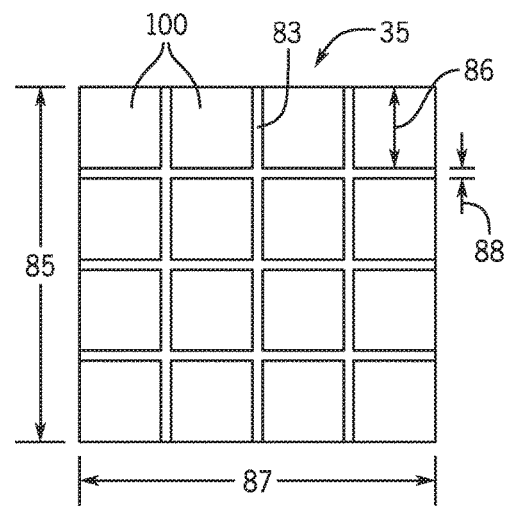
FIG. 12 is a schematic illustration of a top view of a metal coating disposed on a glass layer of the electronic device of FIG. 1, where the metal coating includes a square pattern formed into the metal coating.
Figure 13:
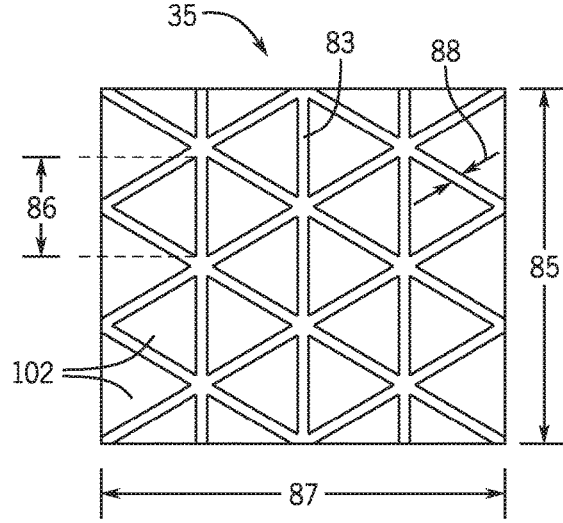
FIG. 13 is a schematic illustration of a top view of a metal coating disposed on a glass layer of the electronic device of FIG. 1, where the metal coating includes a triangular pattern formed into the metal coating.

In accordance with present embodiments, other shapes may be included in the pattern of the metal coating 35. For example, FIG. 12 is a schematic illustration of a top view of the metal coating 35, where the metal coating 35 includes a square pattern formed therein. The square pattern includes several squares 100. Further, FIG. 13 is a schematic illustration of a top view of the metal coating 35, where the metal coating 35 includes a triangular pattern formed therein and the triangular pattern includes several equilateral triangles 102. As previously described, the gap ratio for FIG. 12 and FIG. 13 may be determined by dividing the surface area of the gaps 83 by the total surface area of the combined gaps 83 and shapes 100, 102 (e.g., length 85 multiplied by width 87). The gap ratio, as previously described, may determine, at least in part, how much of the RF signal passes through the metal coating 35.

Figure 14:
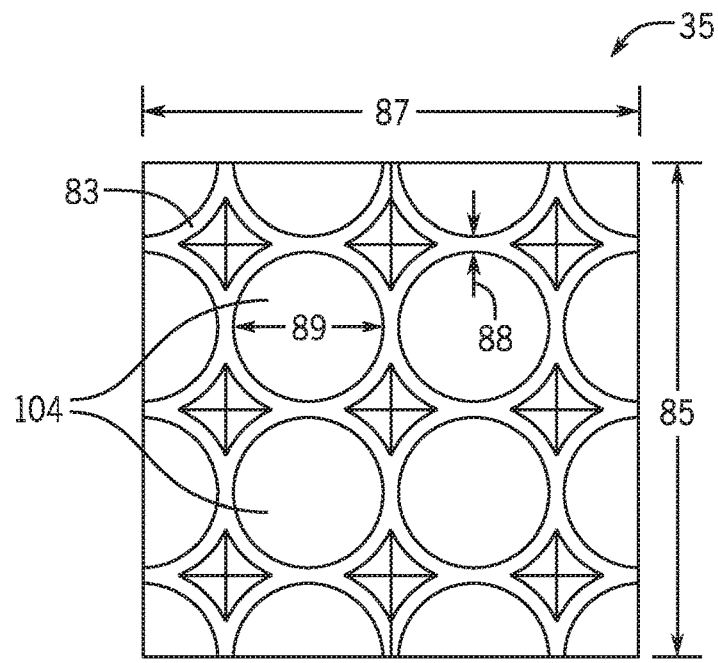
FIG. 14 is a schematic illustration of a top view of a metal coating disposed on a glass layer of the electronic device of FIG. 1, where the metal coating includes a round pattern formed into the metal coating.
Figure 15:
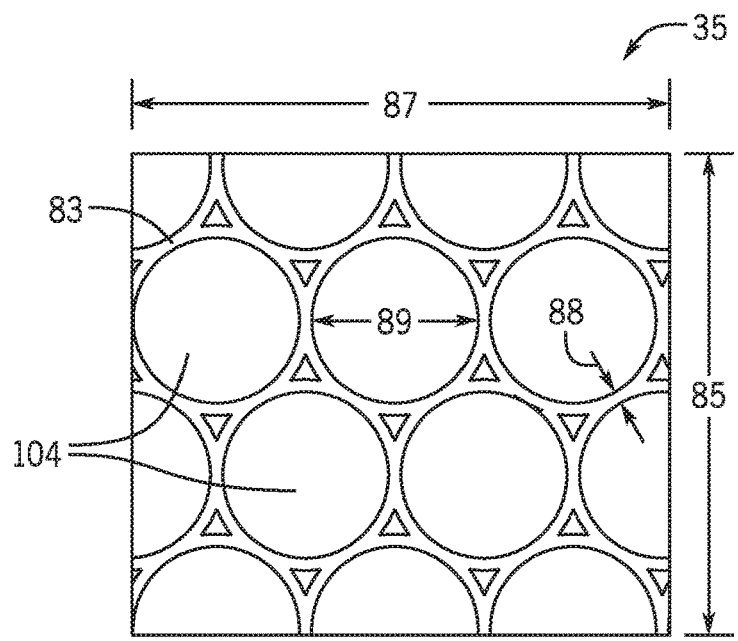
FIG. 15 is a schematic illustration of a top view of a metal coating disposed on a glass layer of the electronic device of FIG. 1, where the metal coating includes another round pattern formed into the metal coating.

Although the embodiments in FIGS. 11-13 illustrate patterns (e.g., etched patterns) having equilateral shapes (e.g., hexagons 84, squares 100, equilateral triangles 102), other shapes and patterns are also possible. For example, FIGS. 14 and 15 are schematic illustrations of top views of the metal coating 35, where the metal coating 35 includes round or circular pattern (e.g., circles 104 with diameters 89), for example, etched or otherwise disposed therein. To determine the gap ratio, as previously described, a surface area of the gaps 83 of the round or circular pattern is divided by the total surface area of the combined gaps 83 and metal of the metal coating 35 (e.g., the length 85 multiplied by the width 87).

Figure 16:
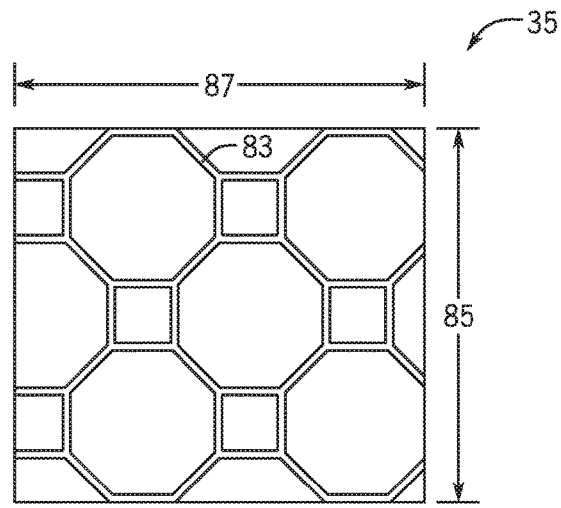
FIG. 16 is a schematic illustration of a top view of a metal coating disposed on a glass layer of the electronic device of FIG. 1, where the metal coating includes a mixed octagonal and square pattern formed into the metal coating.
Figure 17:
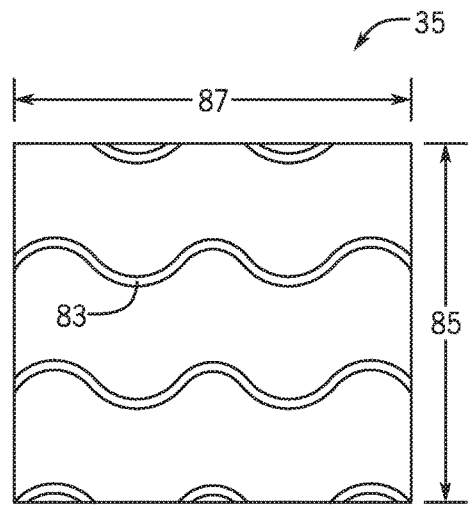
FIG. 17 is a schematic illustration of a top view of a metal coating disposed on a glass layer of the electronic device of FIG. 1, where the metal coating includes a curved-line pattern formed into the metal coating.
Figure 18:
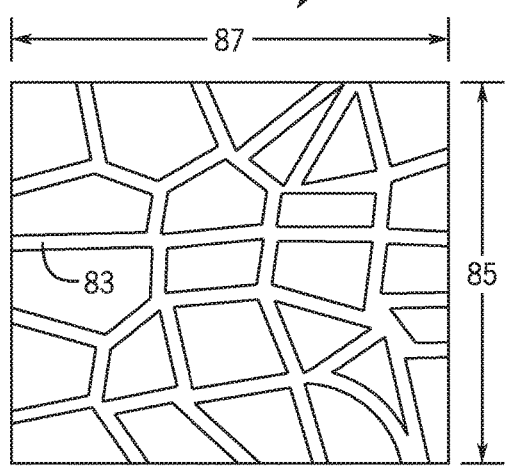
FIG. 18 is a schematic illustration of a top view of a metal coating disposed on a glass layer of the electronic device of FIG. 1, where the metal coating includes a non-uniform pattern formed into the metal coating.

FIG. 16 is a schematic illustration of a top view of the metal coating 35, where the metal coating 35 includes a combination square-octagon pattern, for example, etched or otherwise disposed therein. Further, FIG. 17 is a schematic illustration of a top view of the metal coating 35, where the metal coating 35 includes curvilinear lines, for example, etched or otherwise disposed therein. Further still, FIG. 18 is a schematic illustration of a top view of the metal coating 35, where the metal coating 35 includes a non-uniform pattern, for example, etched or otherwise disposed therein. In FIGS. 16-18, as previously described, the gap ratio may be determined by dividing the surface area of the gaps 83 in the metal coating 35 by the surface area of, for example, the total surface area of the combined gaps 83 plus metal of the metal coating 35 (e.g., the length 85 multiplied by the width 87). It should be noted that other shapes are also possible, including rectangles, ovals, pentagons, etc. Indeed, the shape of the pattern, as well as the size of each feature and the gap width, may also influence the transmissivity of the RF signal.

It should also be noted that, while larger gap ratios may generally enable better transmission of the RF signal, larger gap ratios may also reduce certain benefits of the metal coating 35. For example, larger gap ratios may reduce the heat-resistant, reduction, or reflection capabilities of the metal coating 35. Further, larger gap ratios may reduce an aesthetic quality of the combination of the glass layer 32 and the metal coating 35, especially if the patterns can be detected by the human eye. However, it should also be noted that the types of shapes that form the etched pattern, as well as the size of the shapes, may play a role in the RF signal transmission at least partially independent from the gap ratio. For example, FIGS. 19-25 illustrate simulated data regarding how the factors set forth above impact the RF signal transmission.

Figure 19:
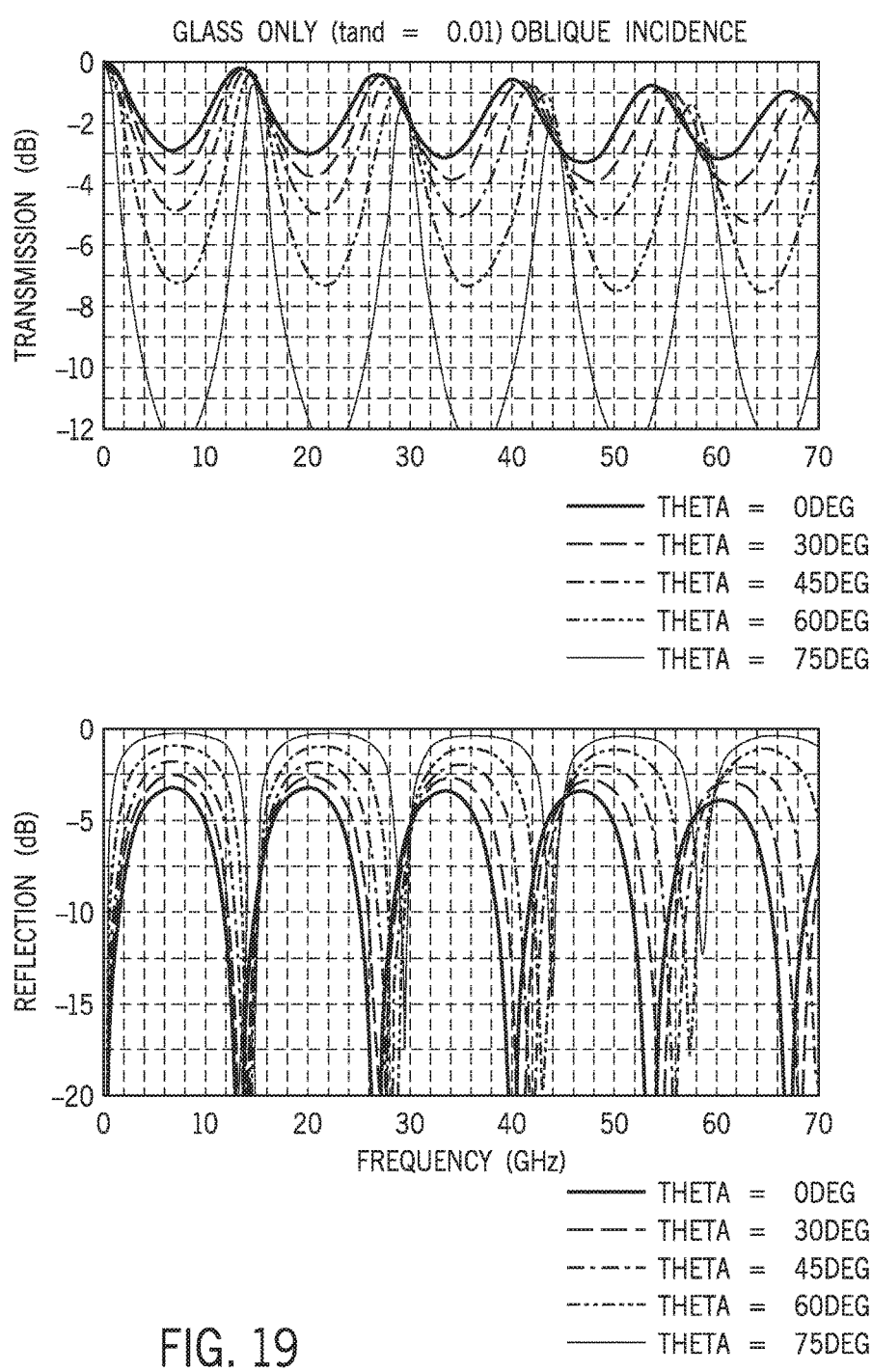
FIG. 19 is an illustration of data relating to transmission of an RF signal through a glass layer of the electronic device of FIG. 1.

FIG. 19 illustrates graphs of transmission and reflection of RF signals up to 70 Ghz with respect to glass, which is generally a material relatively transparent to RF signals. As can be seen, from angles of incidence ranging from θ=0o to θ=75o, the RF signal is depleted only to a maximum of about −3 decibels at θ=0o and to a maximum of −12 decibels for θ=75o. Similarly, very little of the RF signal is reflected at θ=0o, with only about a −3 decibel decay of the RF signal based on reflection for θ=75o.

Figure 20:
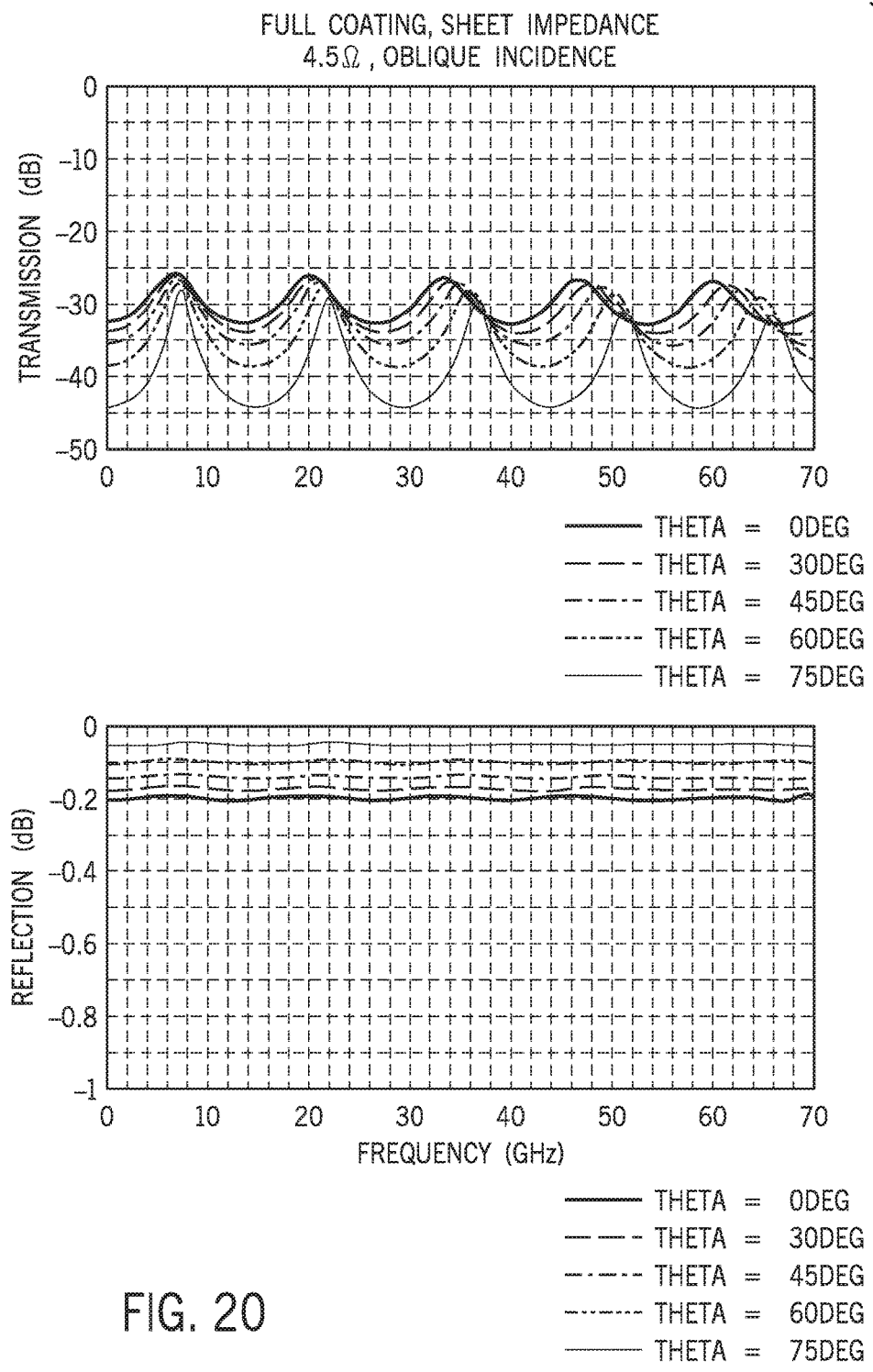
FIG. 20 is an illustration of data relating to transmission of an RF signal through a glass layer and metal coating of the electronic device of FIG. 1.

However, if the glass is covered with even a very thin solid metal coating, little of the RF signal passes through. As illustrated in FIG. 20, it can be seen that for θ=0o, the RF signal has been reduced in power by over 25 decibels, while for θ=75o, the RF signal has been reduced in power by approximately 45 decibels. Similarly, regardless of the angle of incidence, virtually all of the RF signal is reflected by the metal coating.

Figure 21:
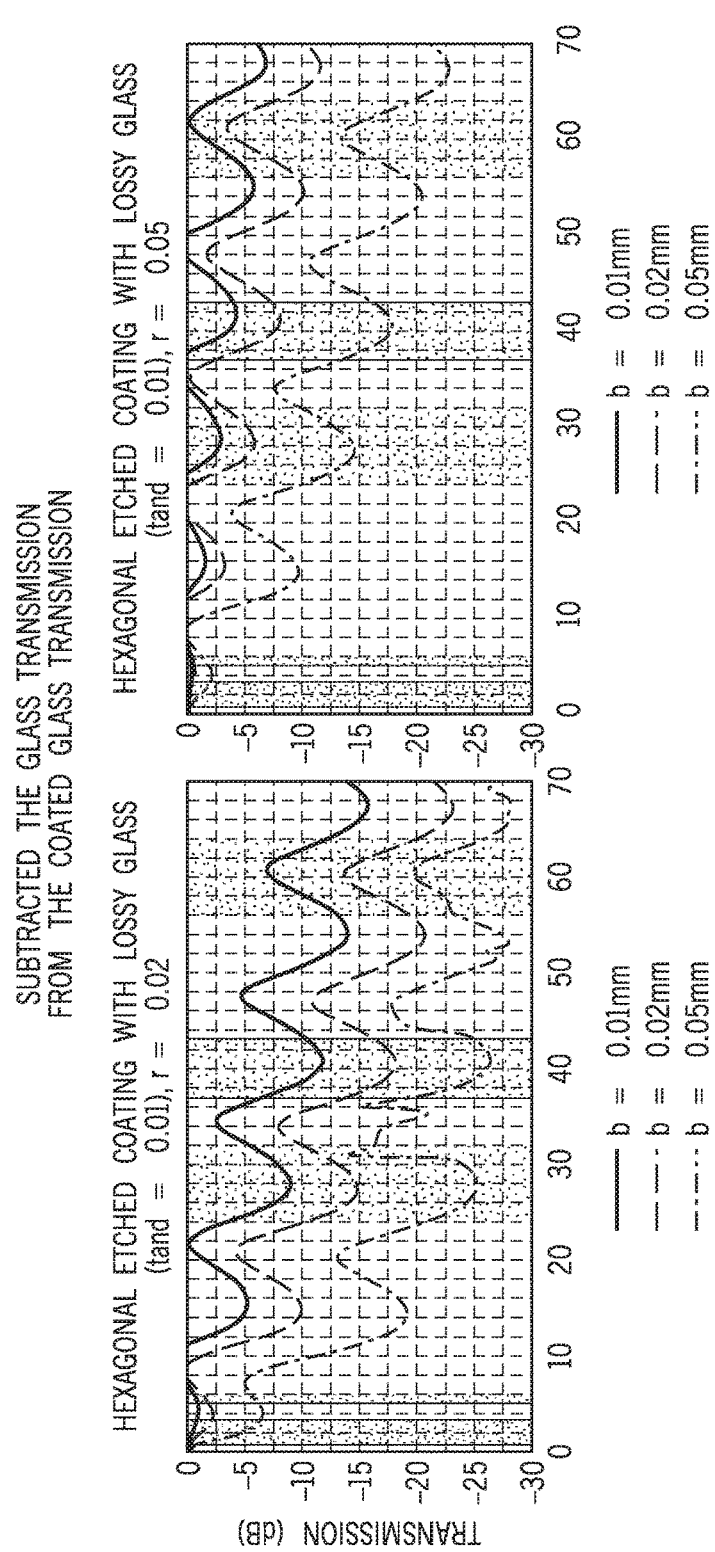
FIG. 21 is an illustration of data relating to transmission of an RF signal through a glass layer and metal coating of the electronic device of FIG. 1, where the metal coating includes a hexagonal pattern.

If patterns are formed in the metal coating, however, as discussed above, a substantial amount of the RF signal is able to pass through the glass and patterned metal coating. As illustrated in FIG. 21, for an hexagonal pattern having a gap ratio of 2% in the first example and 5% in the second example and having gap widths of 0.01 mm, 0.02 mm, and 0.05 mm, a substantial amount of the RF signal is transmitted through the glass and metal coating. This is especially true at lower frequencies and at more direct angles of incidence, such as θ=0 and θ=30, as well as for the higher gap ratio of 5%.

Figure 22:
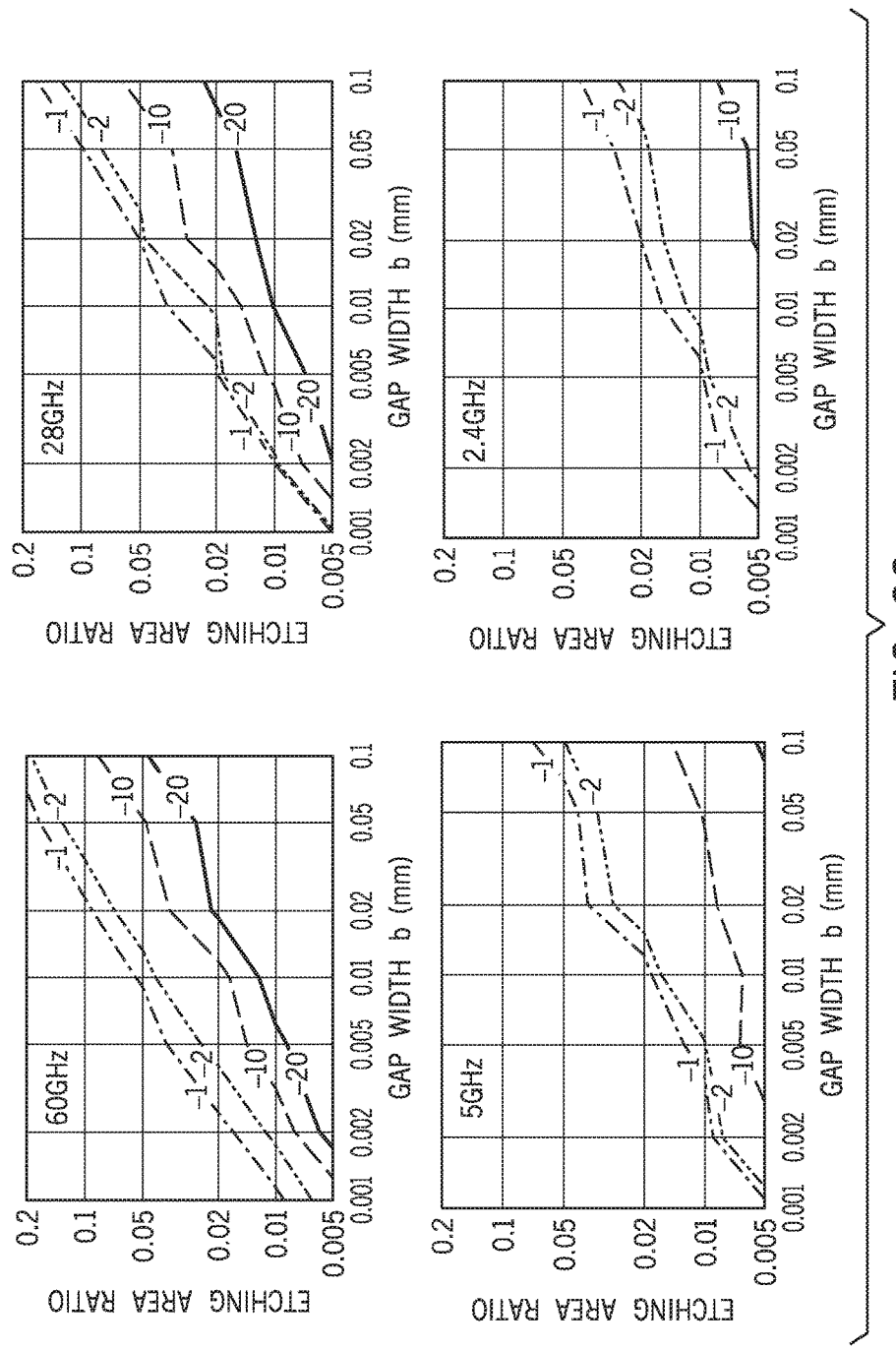
FIG. 22 is an illustration of data relating to transmission of an RF signal having various frequencies through a glass layer and metal coating of the electronic device of FIG. 1, where the metal coating includes a hexagonal pattern.

The feature size and the gap width can also affect the amount of RF signal that is able to pass therethrough. As illustrated in FIG. 22, for various RF signal frequencies, it can be seen that smaller etching ratios having smaller gap widths actually allow more of the RF signal to pass through as compared to higher gap ratios with larger gap widths. In other words, if the feature size is small with small gap widths between the features, the gap ratio will remain low while allowing more of the RF signal to pass therethrough as opposed to having fewer larger features with larger gap widths therebetween.

Figure 23:
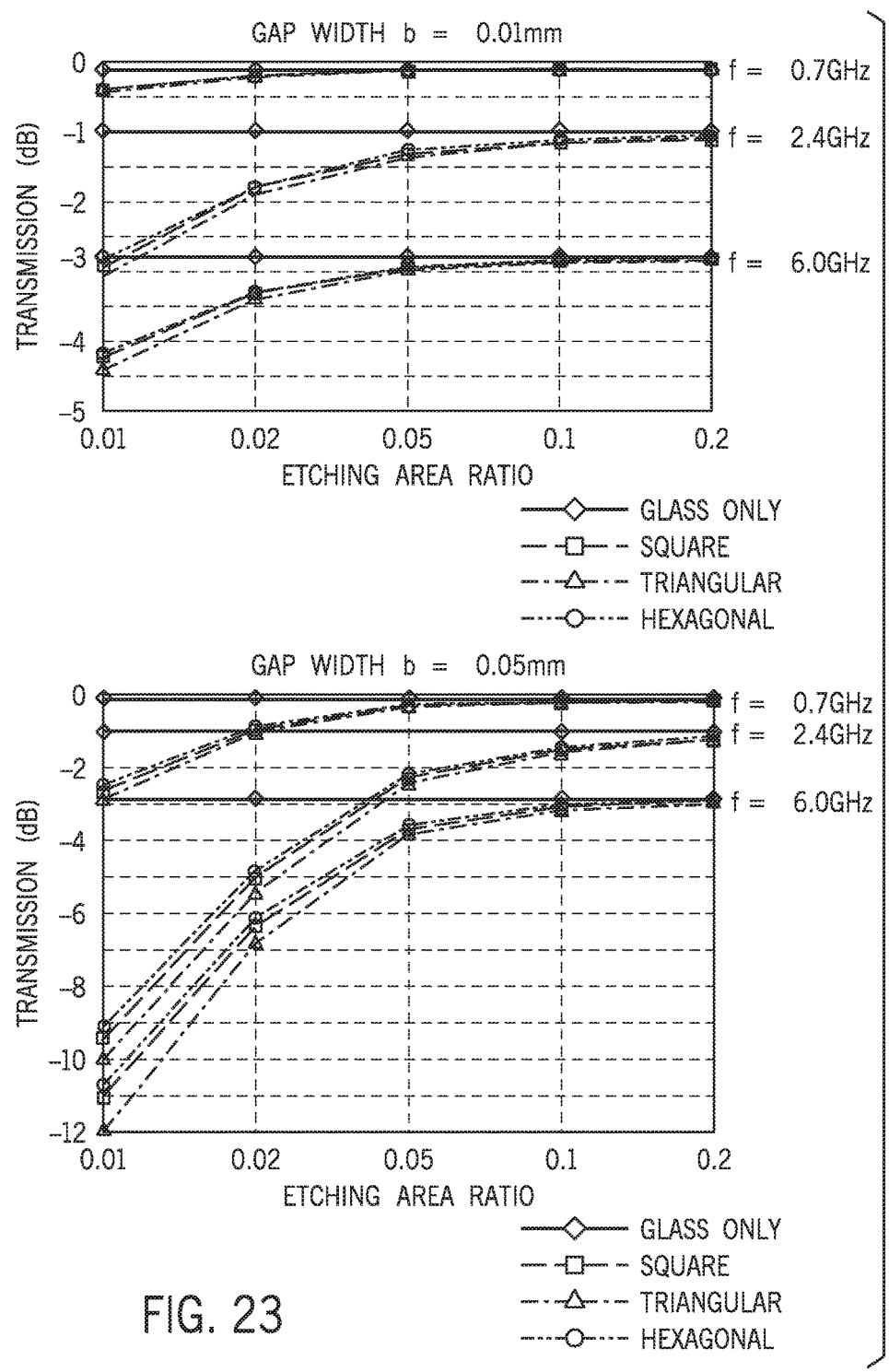
FIG. 23 is an illustration of data relating to transmission of an RF signal through a glass layer and metal coating of the electronic device of FIG. 1, where the metal coating includes variously shaped patterns.
Figures 24, 25:
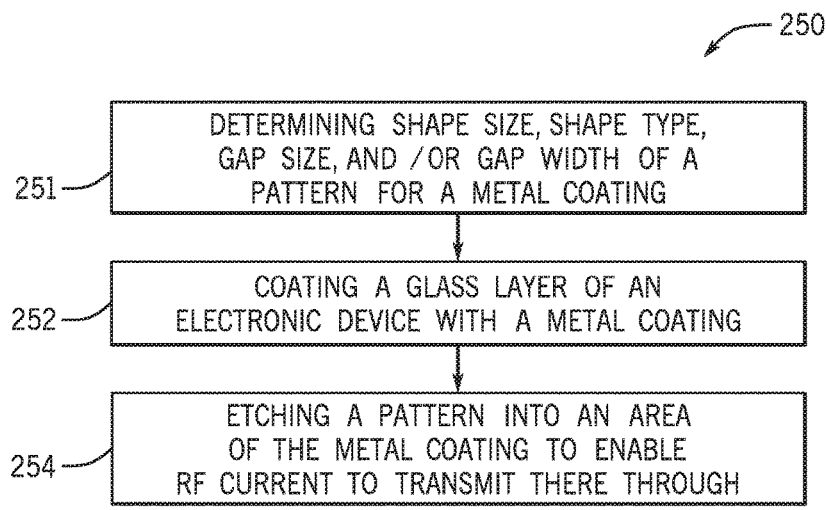
FIG. 24 is an illustration of data relating to calculations of a gap length along shapes of a pattern formed in the metal coating, a gap width along the shapes, and a gap ratio defined in the description below.
FIG. 25 is a process flow diagram illustrating a method of enabling RF signal transmission to and from the electronic device of FIG. 1.

Furthermore, the shape of the pattern may also effect the amount of RF signal that is able to pass through the glass with a patterned metal coating. As illustrated in FIGS. 23 and 24, the glass having a hexagonal metal pattern permits slightly better RF signal transmission as compared to the square pattern, and the square pattern permits slightly better RF signal transmission than the triangular pattern. In certain embodiments, a combination of the above-described patterns, or a non-uniform pattern, can be used to achieve different RF transmission qualities as well as aesthetic or heat reduction/reflection qualities.

FIG. 25 includes a process flow diagram illustrating a method 250 of enabling RF signal transmission to and from the electronic device 10 of FIG. 1. In the illustrated embodiment, the method 250 includes determining (block 251) a shape size, shape type, gap size, and/or gap width of a pattern for a metal coating. For example, as previously described, the gaps forming the pattern may be included to expose a portion of a glass layer on which the metal coating is disposed. Each of the shape size, shape type, gap size, and gap width may play a role in an amount of RF signal that transmits to and from a transceiver of the electronic device.

While the present disclosure has been described and illustrated as implemented in an electronic device, it should be appreciated that the disclosed concepts can be implemented in comparable scenarios involving RF transmission through glass having a metal or other RF opaque coating (e.g., conductive coating) deposited thereon. Examples include buildings and other structures with glass windows, skylights, or other glass openings, all types of motor vehicles, cycles, vessels and the like, or any other structure, device, or apparatus having a glass covered opening through which RF transmission is desired.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A wireless electronic device, comprising:
a transceiver;
a substantially glass outer enclosure in which the transceiver is disposed, wherein the substantially glass outer enclosure comprises a radio frequency (RF) transparent layer; and
an RF opaque coating disposed between the transceiver and the RF transparent layer of the substantially glass outer enclosure, wherein the RF opaque coating comprises a pattern formed therein to enable RF signals to pass therethrough.

2. The wireless electronic device of claim 1, wherein the pattern is disposed in a region of the RF opaque coating proximate to, or aligned with, the transceiver.

3. The wireless electronic device of claim 2, wherein the pattern is disposed only in the region of the RF opaque coating proximate to, or aligned with, the transceiver.

4. The wireless electronic device of claim 1, wherein the RF opaque coating comprises a metal coating.

5. The wireless electronic device of claim 4, comprising a gap ratio between 2 percent and 5 percent.

6. The wireless electronic device of claim 5, wherein the pattern comprises hexagonal shapes, square shapes, equilateral triangular shapes, round shapes, or non-uniform shapes.

7. The wireless electronic device of claim 4, wherein the metal coating acts as a heat shield between internal componentry of the wireless electronic device and the substantially glass outer enclosure.

8. The wireless electronic device of claim 1, comprising an additional RF transparent layer, wherein the RF opaque coating is disposed between the RF transparent layer and the additional RF transparent layer.

9. The wireless electronic device of claim 1, wherein the wireless electronic device comprises a smartphone.

10. The wireless electronic device of claim 1, comprising a display, wherein the transceiver is disposed between the display and the substantially glass outer enclosure.

11. The wireless electronic device of claim 1, wherein the RF opaque coating is disposed on an inner surface of the substantially glass outer enclosure.

12. A method of enabling radio frequency (RF) signal transmission to and from an electronic device, comprising:
   forming a glass case;
   coating an inner surface of the glass case with a metal coating; and
   etching a pattern into an area of the metal coating to enable an RF signal to transmit therethrough.

13. The method of claim 12, comprising locating the area of the metal coating proximate to, or aligned with, a transceiver of the electronic device.

14. The method of claim 12, comprising etching between 2% and 5% of the surface area of the metal coating.

15. The method of claim 12, wherein etching the pattern into the area comprises etching hexagonal shapes, square shapes, equilateral triangular shapes, round shapes, or non-uniform shapes into the area.

16. A housing for an electronic device, the housing comprising:
   an outer casing formed primarily of glass;
   a metal layer disposed on an inner surface of the outer casing; and
   a pattern formed in the metal layer to remove a portion of the metal layer to enable an radio frequency (RF) signal to transmit from the electronic device, or to the electronic device, through the pattern and the outer casing.

17. The housing of claim 16, wherein the pattern comprises hexagonal shapes, square shapes, equilateral triangular shapes, round shapes, or non-uniform shapes, or a combination thereof.

18. The housing of claim 16, wherein the metal layer comprises a first region having the pattern formed into the metal layer, and a second region not having the pattern formed into the metal layer.

19. The housing of claim 16, comprising a gap ratio of at least 2%.

20. The housing of claim 16, comprising a gap ratio of at least 5%.

21. The housing of claim 16, wherein the outer casing comprises a thickness between 4.5 and 5.5 millimeters.

22. The housing of claim 16, comprising an inner RF transparent layer disposed on the metal layer.

23. The housing of claim 16, wherein the metal layer is configured to act as a heat shield between internal componentry of the electronic device and the outer casing.

* * * * *